United States Patent
Sartee et al.

(10) Patent No.: US 9,872,545 B2
(45) Date of Patent: Jan. 23, 2018

(54) ACCESSORY COVERS FOR MOBILE PHONES OR OTHER CONSUMER ELECTRONIC DEVICES WITH BUTTON ASSEMBLY

(71) Applicant: Apple Inc., Cupertino, CA (US)

(72) Inventors: Jared A. Sartee, Pemberton (CA); Matthew Dean Rohrbach, San Francisco, CA (US); Adam K. Eschner, San Francisco, CA (US); Julio C. Quintero, Los Gatos, CA (US); Harry W. Smith, IV, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/087,868

(22) Filed: Mar. 31, 2016

(65) Prior Publication Data
US 2016/0213113 A1    Jul. 28, 2016

Related U.S. Application Data

(63) Continuation of application No. 14/258,977, filed on Apr. 22, 2014, now Pat. No. 9,307,816.
(Continued)

(51) Int. Cl.
*A45C 11/00* (2006.01)
*B23C 3/12* (2006.01)
*H04B 1/3888* (2015.01)

(52) U.S. Cl.
CPC .............. *A45C 11/00* (2013.01); *B23C 3/12* (2013.01); *H04B 1/3888* (2013.01);
(Continued)

(58) Field of Classification Search
CPC .............. A45C 11/00; A45C 2011/002; A45C 2011/003; B23C 3/12; B23C 2228/14;
(Continued)

(56) References Cited

U.S. PATENT DOCUMENTS 4,555,600 A * 11/1985 Morse ................... H01H 13/70
                                                         200/345
5,028,752 A *  7/1991 Sanai ................... H01H 13/52
                                                         200/345
(Continued)

FOREIGN PATENT DOCUMENTS

GB        2234115 A  *  1/1991   ........... H01H 13/702
GB        2248343 A  *  4/1992   ........... H01H 13/702
JP     2011233464 A  * 11/2011   ............. H01H 13/14

*Primary Examiner* — Bryon Gehman
(74) *Attorney, Agent, or Firm* — Downey Brand LLP

(57) ABSTRACT

A durable, accessory cover assembly for a computing device, such as a cellular phone or a tablet computer. The accessory cover includes a frame, a first covering portion, and a second covering portion. The first covering can be composed of a wear-resistant material, such as leather; whereas, the second covering can be composed of a pliable particulate-absorbing material, such as microfiber. The first covering can be configured to seamlessly cover an external bottom surface of the frame, four external lateral surfaces of the frame, and four internal later surfaces of the frame, as well as an overlap region of an internal top surface of the frame. The second covering can be configured cover a majority of the surface area of the internal top surface of the frame, where it abuts the first covering along an annular region.

20 Claims, 13 Drawing Sheets

Related U.S. Application Data

(60) Provisional application No. 61/875,630, filed on Sep. 9, 2013, provisional application No. 61/873,769, filed on Sep. 4, 2013.

(52) U.S. Cl.
CPC ... *A45C 2011/002* (2013.01); *A45C 2011/003* (2013.01); *B23C 2228/14* (2013.01); *B23C 2228/50* (2013.01); *Y10T 29/49826* (2015.01); *Y10T 29/49888* (2015.01); *Y10T 409/30868* (2015.01); *Y10T 409/304032* (2015.01)

(58) Field of Classification Search
CPC ........ B23C 2228/50; H01H 9/02; H01H 9/06; H01H 13/14; H01H 13/70; H01H 13/705; H04B 1/3888; Y10T 29/49826; Y10T 29/49888; Y10T 409/304032; Y10T 409/30868
USPC ................. 206/305, 320; 455/575, 1, 575.8; 361/679.55–59
See application file for complete search history.

(56) References Cited

U.S. PATENT DOCUMENTS

| | | | |
|---|---|---|---|
| 5,092,459 | A | 3/1992 | Uljanic et al. |
| 5,388,691 | A | 2/1995 | White |
| 6,355,890 | B1 * | 3/2002 | Kuroda ................. H01H 13/70 200/345 |
| 7,355,135 | B2 * | 4/2008 | Rainer ................. H01H 13/023 200/345 |
| 8,204,561 | B2 | 6/2012 | Mongan et al. |
| 8,342,325 | B2 | 1/2013 | Rayner |
| 8,681,492 | B2 * | 3/2014 | Fan ........................ F16B 47/00 248/205.5 |
| 8,800,762 | B2 | 8/2014 | Fathollahi |
| 8,960,427 | B2 | 2/2015 | Green et al. |
| 2012/0071217 | A1 | 3/2012 | Park |
| 2013/0042581 | A1 | 2/2013 | Holben et al. |
| 2013/0126372 | A1 | 5/2013 | Song |

* cited by examiner

ACCESSORY COVERS FOR MOBILE PHONES OR OTHER CONSUMER ELECTRONIC DEVICES WITH BUTTON ASSEMBLY

CROSS-REFERENCE TO RELATED APPLICATIONS

This application is a Continuation of U.S. patent application Ser. No. 14/258,977, filed Apr. 22, 2014, entitled "ACCESSORY COVERS FOR MOBILE PHONES OR OTHER CONSUMER ELECTRONIC DEVICES," which claims priority to U.S. Provisional Patent Application No. 61/875,630, filed Sep. 9, 2013, entitled "ACCESSORY COVERS FOR MOBILE PHONES OR OTHER CONSUMER ELECTRONIC DEVICES," and U.S. Provisional Patent Application No. 61/873,769, filed Sep. 4, 2013, entitled "ACCESSORY COVERS FOR MOBILE PHONES OR OTHER CONSUMER ELECTRONIC DEVICES," the contents of which are incorporated by reference herein in their entireties for all purposes.

TECHNICAL FIELD

The present disclosure generally relates to accessory covers for mobile phones, tablet computers, and other consumer electronic devices.

BACKGROUND

Modern consumer electronic devices continue to evolve at an alarming rate. For instance, devices such as cellular phones, tablet computers, and media player devices routinely realize technological advancements while at the same time achieving various form factor advantages pertaining to physical size, device usability, etc. As these apparatuses become more powerful, and in many scenarios, more compact in structure, it becomes increasingly important for consumers to employ improved instrumentalities for protecting the sensitive electronic components and display units of their devices.

At present, a subset of device covers are principally directed to protecting consumer electronic devices by providing for a bulky, overbuilt cover i.e., a weighty hard-shell accessory case, which can be suitably configured to withstand the shock of an accidental impact. Such an impact can occur when the device is dropped or when the device is otherwise struck by a rigid surface. In this scenario, a heavy-duty cover can be configured to prevent a glass device display from being cracked or shattered upon impact. However, this type of device cover typically effectuates cumbersome device usage and/or manipulation that the average consumer would deem to be annoying or not user-friendly.

Another subset of device covers are primarily intended to prevent scratches and abrasions to the exterior of a device, as well as to provide for grip and traction when the device is being handled by a user. Many of these insubstantial covers are made from inexpensive, fragile plastics, neoprene, or some other fabric that does not significantly lessen the effects of a blunt force impact to a covered cellular phone or tablet computing device. Moreover, aesthetic fabric covers are often loosely fit to the device, i.e., a device can simply slip inside the cover, such that the cover can become misaligned over the device, or even irreparably stretched with extended use.

While these accessory covers can function suitably for their intended purposes for a limited period of time, further advancements are desirable to protect and enhance the extended usability of valuable consumer electronic devices. Specifically, there remains a need for new protective covers that are made from a substantially durable material, which are capable of facilitating tactual interactions with various hardware components of an underlying, covered device.

SUMMARY

Accordingly, embodiments of the present disclosure include an accessory cover assembly configured for a specific computing device. In one embodiment, the accessory cover assembly includes a frame formed as a receptacle for the specific computing device. Additionally, the accessory cover assembly includes a first covering portion. The first covering portion covers an external bottom surface of the frame, a plurality of external lateral surfaces of the frame, a plurality of internal lateral surfaces of the frame, and a portion of an internal top surface of the frame. The accessory cover assembly also includes a second covering portion that covers a larger portion of the internal top surface of the frame than the first covering portion. The second cover portion abuts the first covering portion. Moreover, the first covering portion of the accessory cover assembly seamlessly covers a portion of at least six surfaces of the frame.

In another embodiment, a method of fabricating an accessory cover assembly for a portable computing device is set forth. The method of fabricating an accessory cover assembly includes a step of forming disposing a first and second covering on a frame having a shape suitable for receiving a portable computing device. The frame includes an external bottom surface, a plurality of external lateral surfaces, a plurality of internal lateral surfaces, and an internal top surface. The method further includes a step of disposing a first covering of the accessory cover assembly onto an external bottom surface of the frame, a plurality of external lateral surfaces of the frame, a plurality of internal lateral surfaces of the frame, and a portion of an internal top surface of the frame. Next, a second covering of the accessory cover assembly is disposed on a second portion of the internal top surface such that an edge of the second covering abuts an edge of the first covering an annular abutment region. Finally, the first covering is coupled to the second covering at the annular abutment region.

In yet another embodiment, a cutting assembly for manufacturing a material inlay of an accessory cover assembly for a portable computing device is set forth. The cutting assembly includes a support block with a recessed area configured to house a frame of the accessory cover. The frame includes an external bottom surface, a plurality of external lateral surfaces, a plurality of internal lateral surfaces, and an internal top surface. The recessed area of the frame supports the external bottom surface and at least one of the external lateral surfaces. The cutting assembly also includes a retaining plug configured to secure the material inlay disposed on the internal top surface and at least one internal lateral surface of the frame creating a gap between the material inlay disposed within the recessed area of the support block and the retaining plug. The cutting assembly further includes a rotating cutting device configured to cut the material inlay disposed on the internal lateral surface. The cutting device is further configured to fit within and translate within the gap during a cutting procedure. During a cutting operation the cutting device can translate in the same direction as a rotation of the cutting blade of the cutting device. This configuration prevents a portion of the material inlay from becoming misaligned during the cutting procedure.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The presented drawings are intended for illustrative purposes and primarily serve to provide a few examples of possible structures and arrangements for the disclosed accessory covers that are described in further detail within the Detailed Description. The drawings should not to be construed as being all-inclusive. Notably, several changes can be made to the subject matter depicted in the corresponding figures by one having ordinary skill in the art without departing from the spirit and the scope of the disclosure.

DETAILED DESCRIPTION

Exemplary applications of accessory cover assemblies according to the present disclosure are described in this section. Various examples are provided to add context to, and aid in the understanding of, the subject matter of this disclosure. It should be apparent to one having ordinary skill in the art that the present disclosure can be practiced without some or all of these specific details described herein. Further, various modifications and/or alterations can be made to the subject matter described herein and illustrated in the corresponding figures to achieve similar results or similar advantages, without departing from the spirit and scope of the disclosure.

For the remainder of this discussion, accessory cover assemblies that are suitable for use with specific computing device will be described. In particular, for the remainder of this discussion the computing device can take the form of a handheld computing device such as a cellular phone or a tablet computer.

Figure 1:
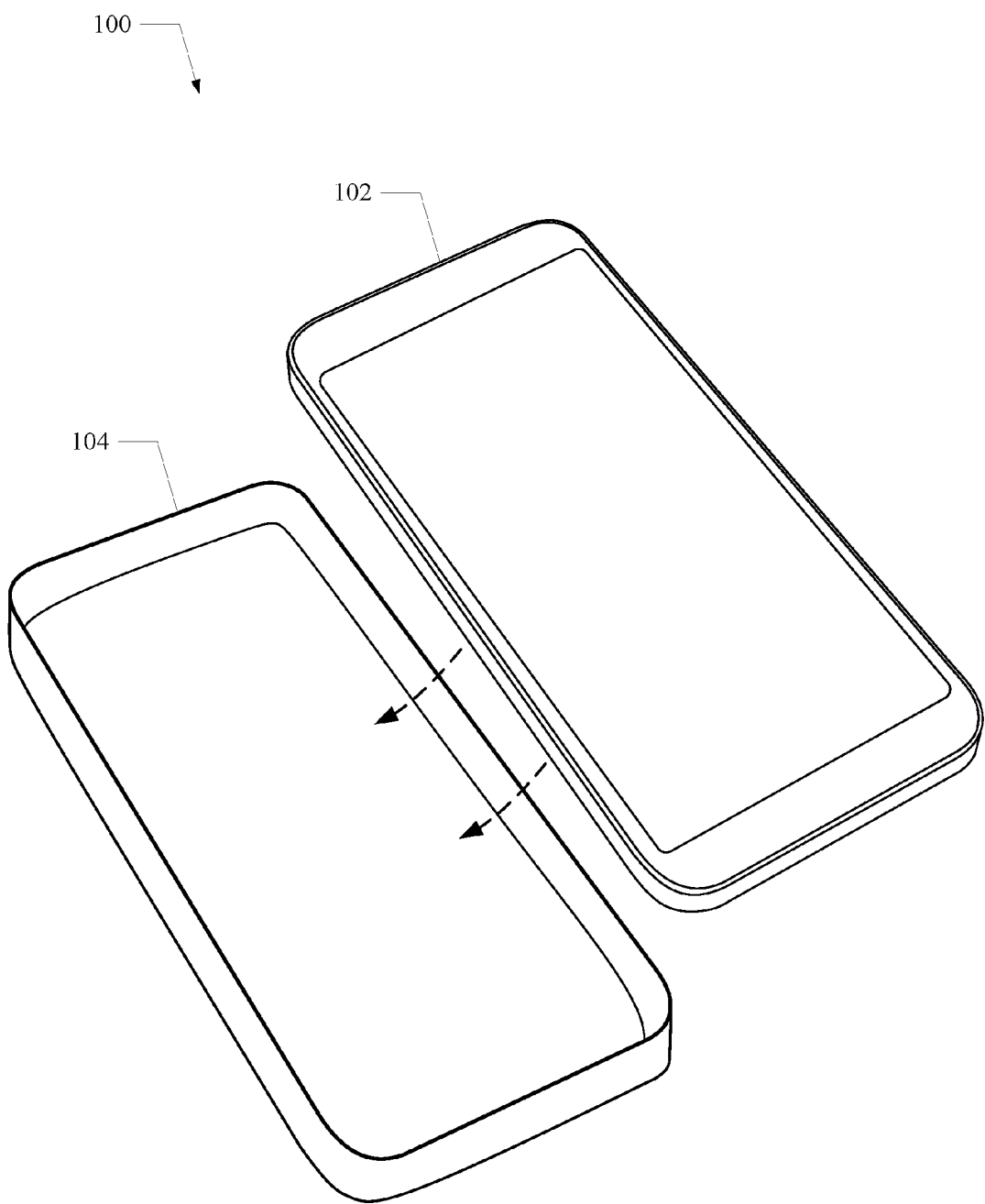
FIG. 1 illustrates a perspective view of an accessory cover for a cellular phone according to an embodiment of the disclosure.

This disclosure describes various embodiments of an accessory cover for a computing device, such as a cellular phone, which can be securely joined with the device for protection. The accessory cover assembly can act as a material sheath that envelops a durable, rigid frame in such a manner that it entirely wraps around a lip of the frame and continues along the internal lateral surfaces of the frame without a seam or break in a singular piece of durable material. In this configuration, the accessory cover assembly is substantially resistant to picking and other forms of wear along the edges and interior lateral surfaces of the accessory cover assembly. This is particularly beneficial, as the edges and interior lateral surfaces of the accessory cover assembly generally receive the most wear, such as in a scenario where a designated computing device is repeatedly inserted into, and/or removed from the accessory cover assembly i.e., as depicted in FIG. 1.

In an exemplary embodiment the material sheath can include a first covering portion and a second covering portion that are joined or otherwise coupled to each other along a single annular seam or abutment. The first covering portion of the accessory cover assembly can be made from a single piece of wear-resistant material which is configured to substantially cover an exterior portion of the frame. In one aspect, the first covering portion can be configured to cover a bottom external surface of the frame, all four external lateral surfaces of the frame, all four internal lateral surfaces of the frame, and at least a portion of the internal top surface of the frame.

Further, in various implementations, the first covering portion and/or the second covering portion of the accessory cover assembly can be affixed to the corresponding frame surfaces with an adhesive to prevent movement or slippage of the first and second covering portions over any surface of the rigid case.

The second covering portion of the accessory cover assembly can be made from a single piece of scratch resistant and/or particulate-absorbing material which can be configured to substantially cover the internal top surface of the frame. Further, in some embodiments either the first covering portion or the second covering portion can be composed of a material having shock absorbing properties, e.g., such as a foam material. In one implementation, the second covering portion can be configured to cover a portion of the internal top surface of the frame in such a manner that the second covering portion directly abuts the first covering portion at and/or on top of the internal top portion of the frame. This abutment or joint between the two covering portions can occur along an annular region encircling a majority of the surface area of the internal top portion of the frame.

In various embodiments, described further herein, the first covering portion of the accessory cover assembly can be joined to the second covering portion of the accessory cover assembly along the annular abutment region via a single seam and/or an adhesive coupling. Further, the accessory cover assembly can be composed from similar or dissimilar material types, such that first covering material can be different than that of the second covering material. A multi-material composition of the accessory cover assembly can be arranged to provide a number of distinct advantages over types of cover assemblies which utilize only one contiguous material type, such as plastic.

FIG. 1 depicts the coupling 100 of accessory cover assembly 104 with a particular computing device 102 according to various embodiments of the present disclosure. The accessory cover assembly 104 can be configured to receive a specific model of a computing device 102. In this regard, the accessory cover assembly 104 can act as a protective receptacle that can securely retain the computing device 102, after insertion.

Additionally, the accessory cover assembly 104 can be adapted with any number of apertures, openings, or thin, pliable covering portions that can allow for, but are not limited to, any of the following: accessory plug-ins, speaker output, microphone input, touch-screen display access and viewing, camera input, switch or button access and/or manipulation, viewing of device aesthetics, etc. These custom-crafted features of the accessory cover assembly 104 must be specifically manufactured to accommodate for the unique characteristics of the computing device 102 as designed by the device's manufacturer. In some embodiments, the placement/positioning of various apertures, openings, and/or pliable covering portions can ensure proper alignment with various device hardware features, e.g., such as a forward-facing and/or a rearward-facing camera.

In some configurations, various apertures or openings of the accessory cover assembly 104 can be formed by laser ablation. In this regard, a laser can remove material from the accessory cover assembly 104 to define aperture patterns there through. Additionally, laser ablation techniques can also be employed to remove material from a desired partial depth through the accessory cover assembly 104 to thin portions of the cover and/or to make portions of the cover more pliable for user manipulations.

Figure 2:
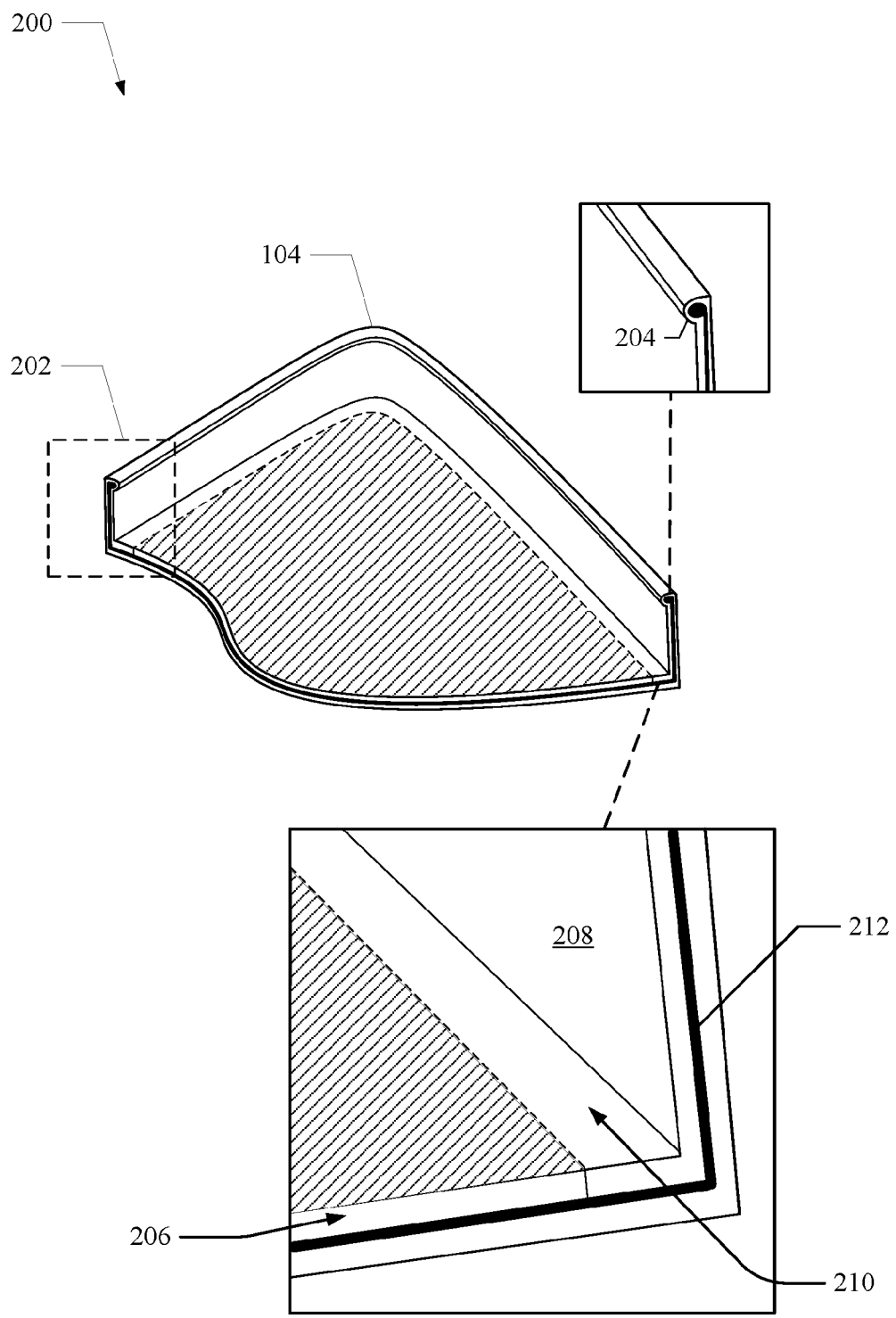
FIG. 2 illustrates a cross-sectional perspective view of the accessory cover depicted in FIG. 1 including an identified area of interest in accordance with some embodiments.

FIG. 2 represents a cross-sectional perspective view 200 of the accessory cover assembly 104 depicted in FIG. 1, which includes an identified cross-sectional area of interest 202, i.e., the area encompassed by a dotted rectangle, which can be representative of various implementations of the accessory cover assembly 104 that are described in further detail herein. In various embodiments, the cross-sectional area of interest 202 of the accessory cover assembly 104 can correspond to the related cross-sectional views 300, 400, and 600, respectively shown in FIGS. 3, 4, and 6. It should be understood that the cross-sectional views 500 and 700, depicted in FIGS. 5 and 7 correspond to a different cross-sectional area of interest 202 of the accessory cover assembly 104 that is located in an area designated for covering a device button or switch.

The accessory cover assembly 104 can have a first covering portion 208 that extends over the edges of a frame 212, and a second covering portion 206 that extends over a majority of an internal bottom surface of the frame 212. The first covering portion 208 can extend over the internal bottom surface of the frame 212 creating an overlap region 210. In this way, the overlap region 210 is defined by the abutting edges of the first covering portion 208 and the second covering portion 206.

In FIG. 2, a computing device 102 can be inserted into the accessory cover assembly 104, and a lip 204 that is positioned along the upper periphery of the accessory cover assembly 104 can be configured to tightly slip over a topside edge or corner of the computing device 102 in response to a downward force being applied to the computing device 102 during insertion. In this regard, a consumer may be able to simply and easily press their computing device 102 into its protective accessory cover with minimal applied force, such that it achieves snap a snap-fit configuration against the lip 204. Advantageously, the lip 204 of the accessory cover assembly 104 is positioned to protrude over, and on top of, the topside edge of the computing device 102 to prevent it from accidentally ejecting out of the accessory cover assembly 104 during use or drops.

Figure 3:
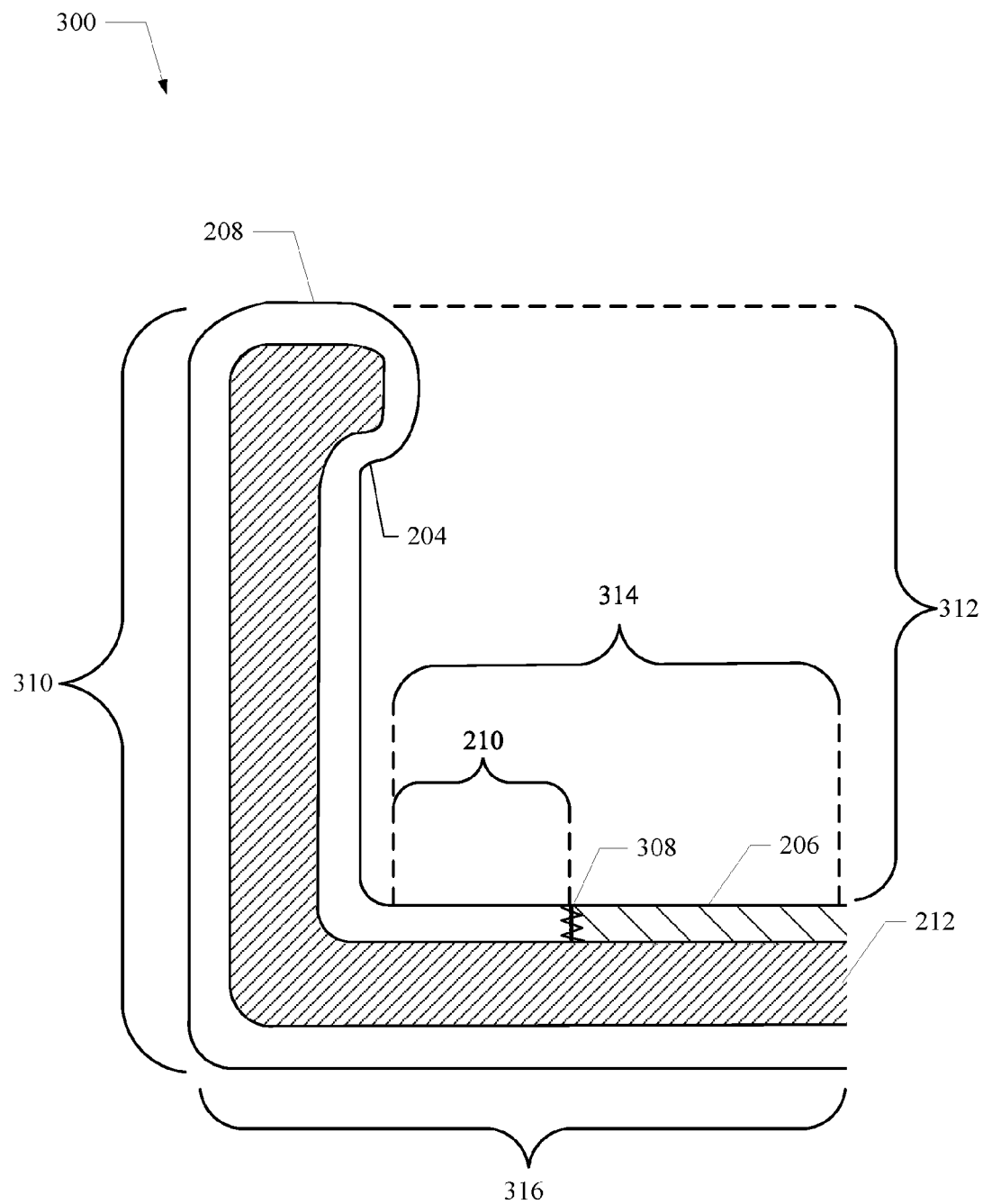
FIG. 3 illustrates a cross-sectional view of the identified area of interest of the accessory cover depicted in FIG. 2 according to an embodiment of the disclosure.

FIG. 3 illustrates a cross-sectional view 300 of the identified area of interest 202 of the accessory cover assembly 104 of FIG. 2 according to an implementation of the disclosure. As depicted, the cross-sectional view 300 of the accessory cover assembly 104 includes, but is not limited to, a frame 212 (which may also be referred to as a "case" or a "shell"), a first covering portion 208, a second covering portion 206, and a coupling portion 308 (also referred to as a "joint").

In various implementations, the frame 212 of the accessory cover assembly 104 can be composed of any one of, or combination of: fiberglass, steel, carbon fiber, plastic, nylon, or other suitable rigid or semi-rigid material types. A laser ablation can remove portions of a frame 212 of the accessory cover assembly 104, while allowing one or more other portions of the frame 212 of the accessory cover assembly 104 to remain intact at its original thickness. The material composition of the frame 212 can be selected to define its function, relating to its inherent material properties. For example, during a press-fit or snap-fit action, a user inserting or extracting his or her computing device 102 from the accessory cover assembly 104 may be able to more readily detach, or securely position, his or her device 102 within the accessory cover assembly 104 based on the selected material composition of the frame 212 of the accessory cover assembly 104.

In an embodiment, the first covering portion 208 of the accessory cover assembly 104 can be positioned over and/or on top of an external bottom surface 316 of the frame 212 in a manner such that the external bottom surface 316 of the frame 212 can be completely covered by the first covering portion 208. Further, the first covering portion 208 can also be simultaneously positioned over and/or on top of an external lateral surface 310 of the frame 212 such that the external lateral surface 310 of the frame 212 can be completely covered by the first covering portion 208.

The first covering portion 208 can be simultaneously positioned over and/or on top of an internal top surface 314 of the frame 212 in a manner such that the internal top surface 314 of the frame 212 can be completely covered by the first covering portion 208. Lastly, the first covering portion 208 can be simultaneously positioned over and/or on top of at least a portion of an internal top surface 314 of the frame 212 such that the internal top surface 314 of the frame 212 can be completely covered by the first covering portion 208.

In an embodiment, the second covering portion 206 of the accessory cover assembly 104 can be positioned over and/or on top of an internal bottom surface of the frame 212 in a manner such that the internal bottom surface of the frame 212 can be substantially covered by the first covering portion 208. For example, the second covering portion 206 can be configured to cover the entire surface area of the internal bottom surface of the frame 212, except for an overlap region 210. The overlap region 210 is a segment of the first covering portion 208 that extends over a portion of the internal top surface 314 of the frame 212. The overlap region 210 terminates at an edge of the first covering portion 208 where the second covering portion 206 abuts the first covering portion 208 at a coupling portion 308.

In an exemplary implementation, the first covering portion 208 of the accessory cover assembly 104 can be composed of a durable non-fabric material, such as leather, e.g., Nubuck leather, imitation leather, or suede. In other implementations, the first covering portion 208 can be composed of a durable fabric material, such as microfiber, woven or non-woven fabrics, or a polymer-based film, e.g., polyurethane film or thermoplastic polyurethane film. The material selected for the first covering portion 208 can be configured to be substantially wear-resistant and sufficiently resilient enough to withstand various anticipated impacts, scuffs, abrasions, as well as natural elements i.e., heat, cold, rain, snow, etc.

In some embodiments, the second covering portion 206 of the accessory cover assembly 104 can be composed of a fabric material, such as microfiber, woven or non-woven fabrics, or a polymer-based film, e.g., polyurethane film or thermoplastic polyurethane film. Alternatively, the second covering portion 206 can be composed of a durable non-fabric material, such as leather, imitation leather, or suede. Alternatively, the second covering portion 206 can also be composed of a fabric material, such as microfiber, woven or non-woven fabrics, or a polymer-based film, e.g., polyurethane film or thermoplastic polyurethane film. Additionally, in some embodiments either the first covering portion 208 or the second covering portion 206 can be composed of a material having shock absorbing properties, e.g., such as a foam material.

In some scenarios, consistent with the above-mentioned material options for the first covering portion 208 and the second covering portion 206, the accessory cover assembly 104 can be composed of both a non-fabric material and a fabric material, i.e., dissimilar material types. In other scenarios, the accessory cover assembly 104 can be composed entirely of a non-fabric material type(s), or alternatively, entirely of a fabric material type(s).

Regardless of the various possible material arrangements for the first covering portion 208 or the second covering portion 206, it should be understood that a whole piece of material associated with the first covering portion 208 can be configured to entirely wrap around a lip 204 of the frame 212 and then continue along an internal lateral surface 312 of the frame 212 without a seam or break. The lip 204 of the frame 212 is at a distal end of the lateral surface of the accessory cover assembly 104 and extends above and over an internal top surface 314 of the accessory cover assembly 104.

The accessory cover assembly 104 can advantageously configured to be substantially resistant to picking and abrasion along all edges of the accessory cover assembly 104. Further, by pulling the first covering portion 208 down over the internal lateral surface(s) 312 of the frame 212, the accessory cover assembly 104 can also be substantially resistant to picking abrasions that could otherwise be caused by apertures cut through the internal lateral surface 312 and external lateral surface 310 of the frame 212, a scenario which could occur if the coupling portion 308 were positioned above or directly over one or more frame 212 apertures.

In various embodiments, the coupling portion 308 of the accessory cover assembly 104 can be positioned above the internal top surface 314 of the frame 212 a preset, optimal distance inward from the internal lateral surfaces 312 of the frame 212 so as to reduce wear to the coupling portion 308 when a device 102 is inserted into and removed from the accessory cover assembly 104. In various implementations, the coupling portion 308 can join the first covering portion 208 to the second covering portion 206 using any suitable adhesive, e.g., glue, epoxy resin, or double-sided tape, or stitching implement, such as a nylon thread having relatively high tensile strength. Further, in some scenarios, a seam tape can be applied over the coupling portion 308 as an additional adhesive that can be employed to further reduce wear and/or abrasions at the coupling portion 308.

In some implementations, the coupling portion 308 of the accessory cover assembly 104 can be annular in shape, such that the coupling portion 308 is located entirely around, and on top of, a periphery region of the internal top surface 314 of the frame 212. In this configuration, there may only be one connected coupling for the accessory cover assembly 104, which is where the first covering portion 208 abuts and/or joins with the second covering portion 206. Once coupled via the coupling portion 308, the first covering portion 208 and second covering portion 206 can be configured to envelop the entire frame 212.

Figure 4:
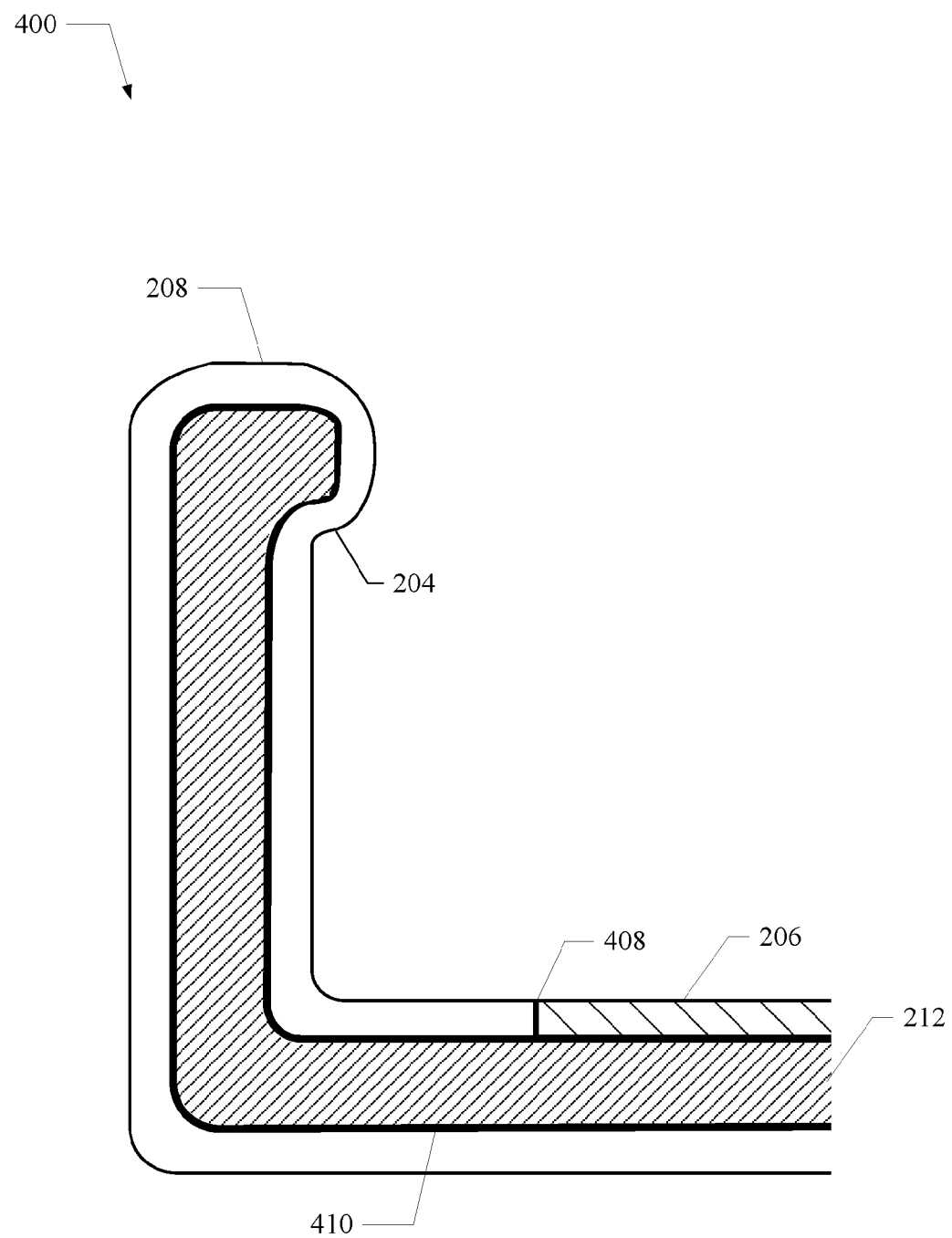
FIG. 4 illustrates a cross-sectional view of the identified area of interest of the accessory cover depicted in FIG. 2 according to an embodiment of the disclosure.

FIG. 4 shows a cross-sectional view 400 of the identified area of interest 202 of the accessory cover assembly 104 depicted in FIG. 2 according to an embodiment of the disclosure. In this implementation, the first covering portion 208 can be physically joined to the frame 212 along its entire interior surface area with an adhesive 410. Similarly, the second covering portion 206 can be physically coupled to the frame 212 along its entire interior surface area with the adhesive 410. In various embodiments, the adhesive 410 can be applied to the surface area(s) of any combination of, or all of the first covering portion 208, the second covering portion 206, and the frame 212.

As described above, the adhesive 410 can pertain to any suitable adhesive, including, but not limited to, glue, epoxy resin, double-sided tape, etc. The adhesive 410 can adhere or couple the first covering portion 208 and/or the second covering portion 206 to the frame 212. The adhesive 410 can advantageously prevent slippage or misalignment of the first covering portion 208 and the second covering portion 206 over the frame 212. This can facilitate continued use of the accessory cover assembly 104 over a relatively lengthy duration, as compared to other accessory cover assemblies that are loosely fit to the computing device 102.

Additionally, the accessory cover assembly 104 can include an adhesive coupling portion 408 that can include any suitable adhesive, including, but not limited to, glue, epoxy resin, double-sided tape, etc. The adhesive coupling portion 408 can be positioned above the internal top surface 314 of the frame 212 a set distance in from the internal lateral surfaces 312 of the frame 212 to reduce wear to the coupling portion 308 when a device 102 is inserted into and removed from the accessory cover assembly 104.

In certain implementations, the adhesive(s) employed by the adhesive 410 and/or in the adhesive coupling portion 408 can comprise a thermoplastic adhesive, such as a thermoplastic urethane adhesive, or a thermoplastic nylon adhesive. Thermoplastic adhesives can be melted in order to glue together multiple layers of material together. Furthermore, thermoplastic adhesives can form structural elements on the surfaces of the frame 212 to create a more rigid frame 212.

Figure 5:
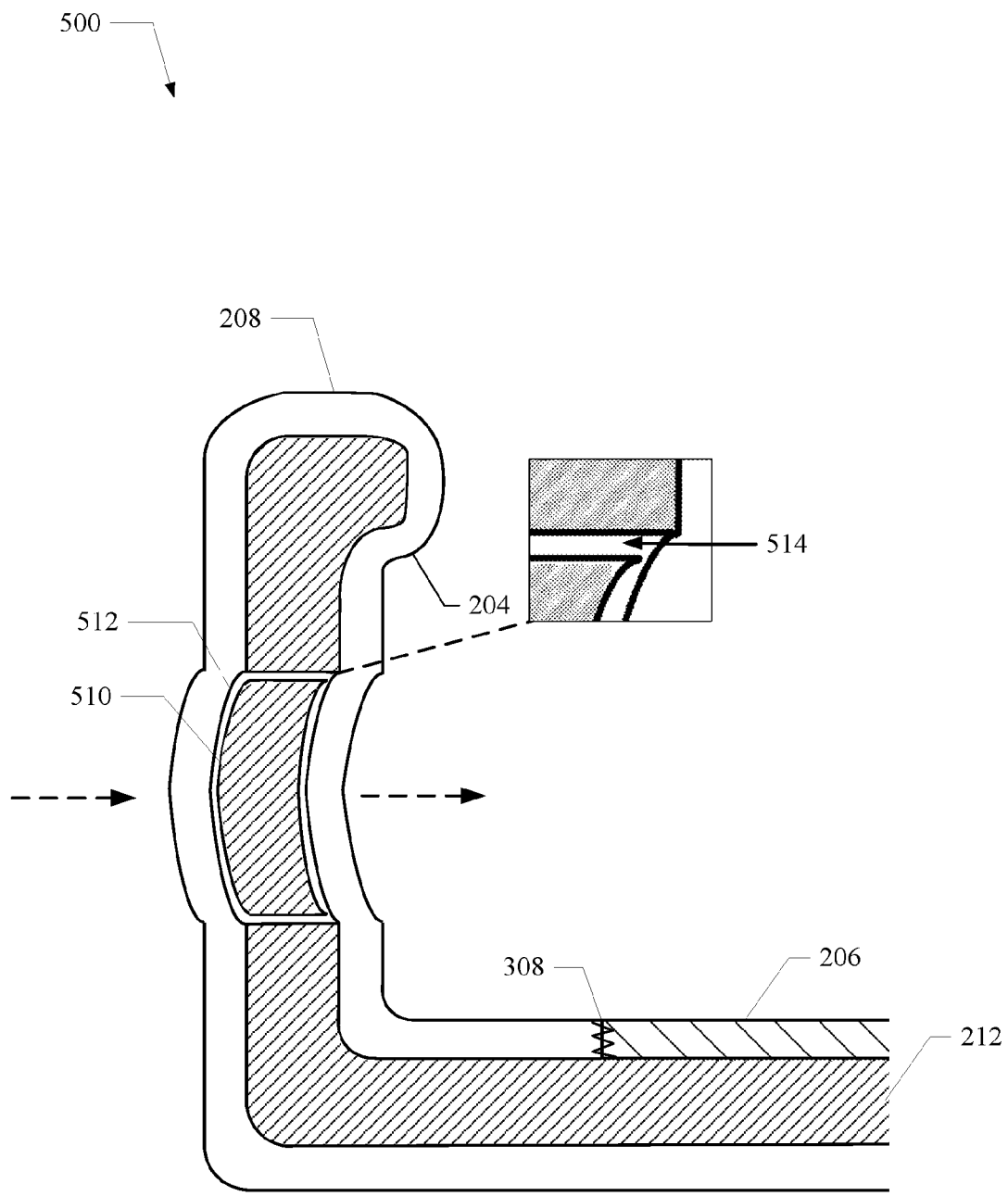
FIG. 5 illustrates a cross-sectional view of a portion of the accessory cover depicted in FIG. 1 including a floating button assembly according to an embodiment of the disclosure.

FIG. 5 represents a cross-sectional view 500 of a portion of the accessory cover assembly 104 depicted in FIG. 1 including an auxiliary floating button 510 according to an implementation of the disclosure. In this configuration, a portion of the frame 212 can be configured to include an aperture 512 (also referred to as an "opening") that is specifically positioned over an anticipated location of a device button (not shown), i.e., at a time when the computing device 102 is positioned within the accessory cover assembly 104. The aperture 512 can enable a corresponding device button of the computing device 102 to be actuated by a user when the computing device 102 is positioned within its accessory cover assembly 104.

To enhance tactile manipulation of the device button of the computing device 102 through the aperture 512, auxiliary floating button 510 can be configured to reside within aperture 512, creating a gap 514 between the wrapped layers of the first covering portion 208 of the accessory cover assembly 104. In various implementations, the auxiliary floating button 510 can be coupled to the first covering portion 208 on an internal lateral region and external lateral region of relative to the frame 212 with an adhesive, such as the adhesive 410 described above and shown on the cross-sectional view 400 of the accessory cover assembly 104 in FIG. 4. In other embodiments, the auxiliary floating button 510 is not coupled to the first covering portion 208 on both sides, thereby allowing for less restricted movement of the auxiliary floating button 510 within the gap 514. Moreover, in other embodiments, the first covering portion 208 (or the second covering portion 1006 in FIG. 10) can be permanently embossed or debossed such that the material of the first covering portion 208 is raised or sunk to receive the auxiliary floating button 510 and give the user a better sense of where the auxiliary floating button 510 is located.

It should be understood, that the auxiliary floating button 510 could be coupled to the accessory cover assembly 104, within the aperture 512, by any other suitable joining means, without departing from the spirit and scope of the disclosure. It should also be appreciated that the first covering portion 208 and the second covering portion 206 of the accessory cover assembly 104, as depicted in FIG. 5, can be similarly adhered to the frame 212 via the adhesive 410. In the illustration of FIG. 5, the adhesive 410 has been omitted for clarity in order to focus on the physical positioning and structure of the auxiliary floating button 510 within the aperture 512.

In an embodiment, when an external surface of the first covering portion 208, positioned directly over the auxiliary floating button 510 and aperture 512, is pressed by a device user, the auxiliary floating button 510 can effectuate an actuation of a corresponding button of the device 102. In this artificially enhanced configuration, a user pressing the button of the device 102 through the accessory cover assembly 104 can achieve a more vivid sense of contact with the underlying control components of device 102. In some implementations, a gap 514 within the aperture 512, between the frame 212 and the auxiliary floating button 510, can be filled with a compressible and/or nonstick filler or material to further prevent the auxiliary floating button 510 from being misaligned within the accessory cover assembly 104. In other embodiments, the gap 514 within the aperture 512 can be hollow, and filled with air or fluid.

Figure 6:
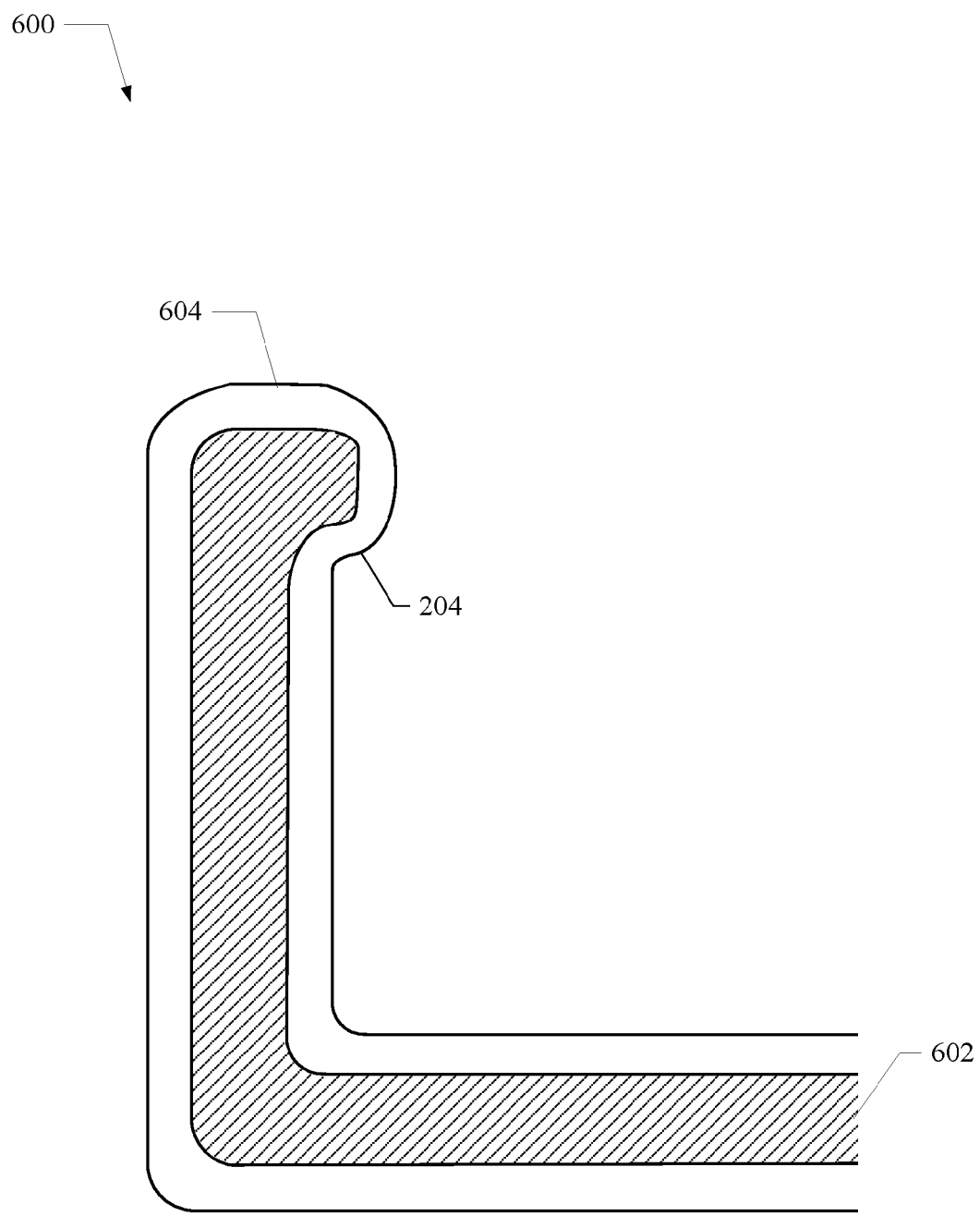
FIG. 6 illustrates a cross-sectional view of the identified area of interest of the accessory cover depicted in FIG. 2 according to another embodiment of the disclosure.

FIG. 6 illustrates a cross-sectional view 600 of the identified area of interest 202 of the accessory cover assembly 104 depicted in FIG. 2 according to another embodiment of the disclosure. In this embodiment, the frame 602 of the accessory cover assembly 104 can be coated with a protective sealant 604, such as a silicon or rubber sealant material, that can provide for grip or traction, as well as, shock absorption when the device 102 is dropped or otherwise exposed to some force of impact. In various implementations, the covering material or layer of the protective sealant 604 can be applied to the frame 602 by dipping the frame into a viscous liquid sealant material or by spraying the frame with one or more coatings of a suitable protective sealant material type.

Figure 7:
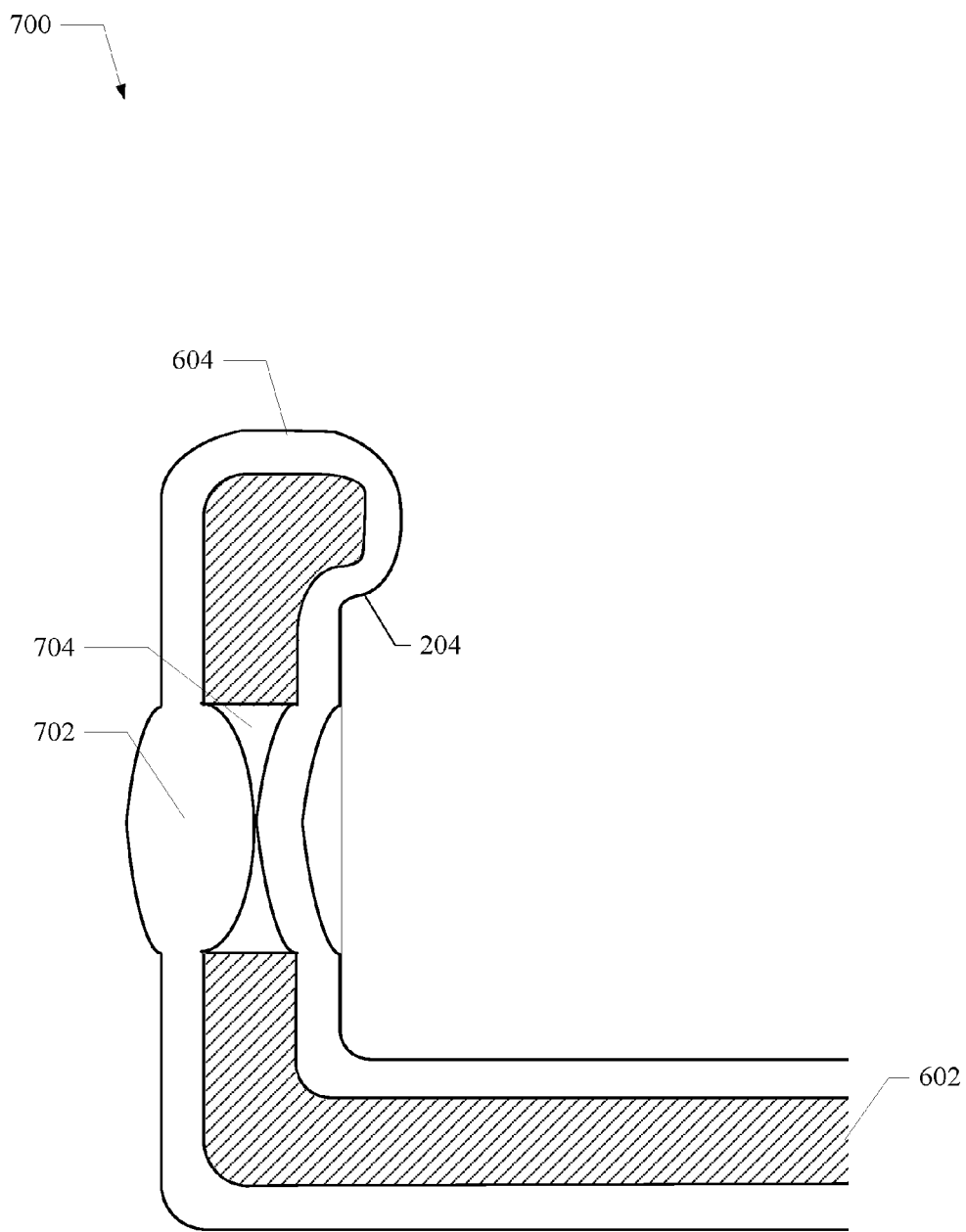
FIG. 7 illustrates a cross-sectional view of a portion of the accessory cover depicted in FIG. 1 including a button assembly according to an embodiment of the disclosure.

FIG. 7 shows a cross-sectional view 700 of a portion of the accessory cover assembly 104 depicted in FIG. 1 including another button assembly according to an implementation of the disclosure. In this configuration, a portion of the frame 602 can be configured to include an aperture 704 that is specifically positioned over an anticipated location of a device button, i.e., when the computing device 102 is positioned within the accessory cover assembly 104. The aperture 704 can enable a device button of the computing device 102 to be actuated by a user.

To effectuate the manipulation of the button of device 102 through the aperture 704, a protruding button portion 702 can be fabricated to reside within the aperture 704, between the protective sealant 604 disposed on opposite sides of a lateral surface of the frame 602. The aperture 704 can include a gap or space filled with air or fluid. In various implementations, the protruding button portion 702 can be composed of a similar material as the protective sealant 604, and of a varying thickness from a remainder of the protective sealant 604 coating that is applied to the frame 602. In other embodiments, the protruding button portion 702 can be composed of a different material than the protective sealant 604. Alternatively, the protruding button portion 702 can encapsulate some form of auxiliary button to provide additional thickness and a more realistic button press experience to a user.

Figure 8:
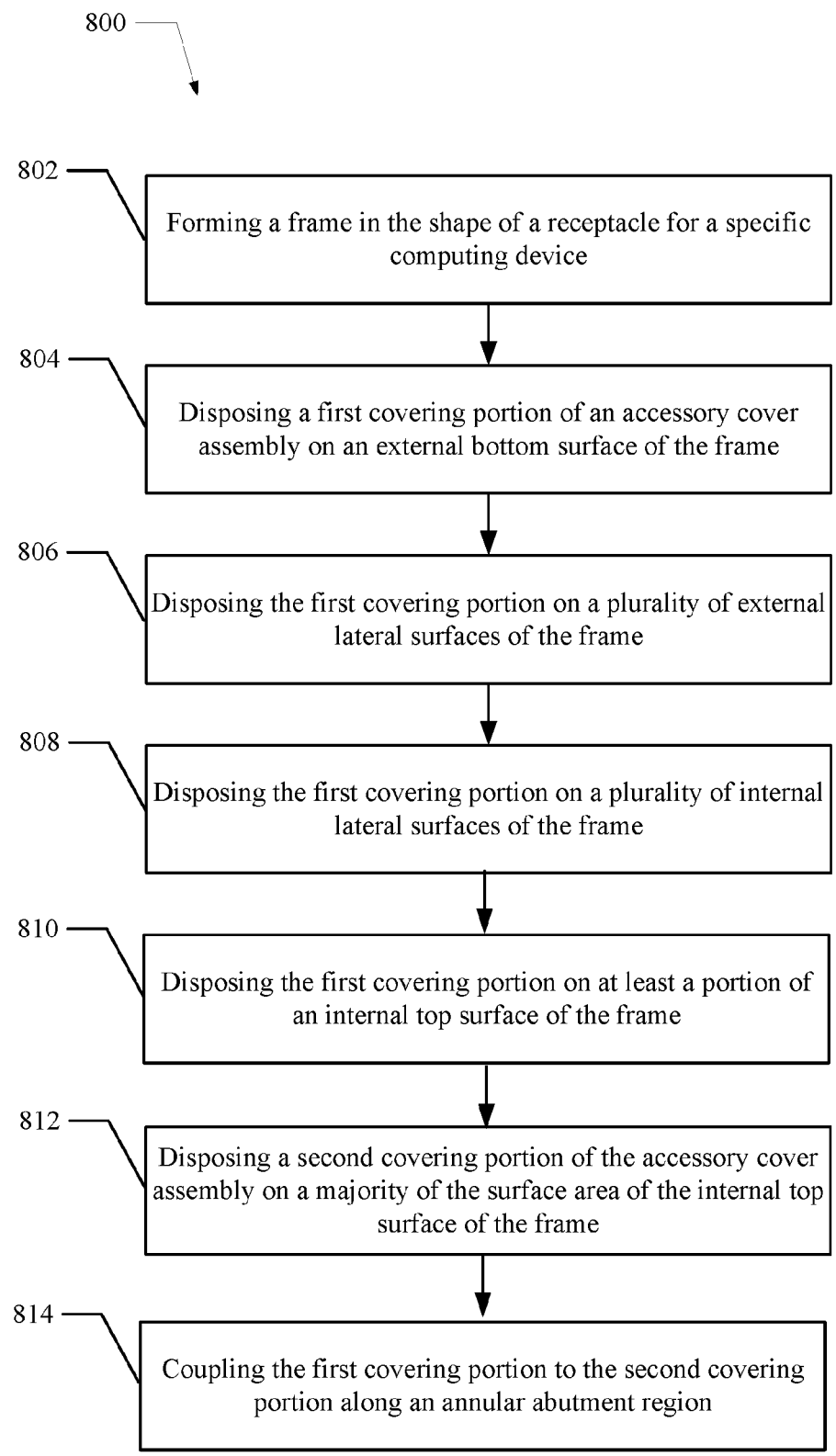
FIG. 8 illustrates a flow diagram of a fabrication procedure of an accessory cover assembly according to an embodiment of the disclosure.

FIG. 8 depicts a flow diagram 800 of a fabrication procedure of an accessory cover assembly 104 according to an embodiment of the disclosure. The fabrication process can result in the production of an accessory cover assembly 104 similar to those depicted in FIGS. 1 through 5, and described above. At block 802 a frame 212 can be formed from a suitable material type in a specific shape to house a specific computing device. Next, at block 804, a first covering portion 208 of the accessory cover assembly 104 can be disposed, i.e., adhered to, on an external bottom surface 316 of the frame 212. Then, at block 806, the first covering portion 208 can be disposed on, i.e., adhered to, a plurality of external lateral surfaces 310 of the frame, i.e., on all four external lateral sides of the frame 212.

Subsequently, at block 808, the first covering portion 208 can be disposed on, i.e., adhered to, a plurality of internal lateral surfaces 312 of the frame 212, i.e., on all four internal lateral sides of the frame 212. Next, at block 810, the first covering portion 208 can be disposed on, i.e., adhered to, at least a portion of an internal top surface 314 of the frame 212. Then, at block 812, a second covering portion 206 of the accessory cover assembly 104 can be disposed on, i.e., adhered to, a majority of a surface area of the internal top surface 314 of the frame 212 such that the second covering portion 206 abuts the first covering portion 208 thereon. Thereafter, at block 814, the first covering portion 208 and the second covering portion 206 can be coupled, i.e., adhered to each other and/or stitched together, along an annular abutment region. The annular abutment region is a region where the outside edges of the second covering portion 206 abut the first covering portion 208.

Figure 9:
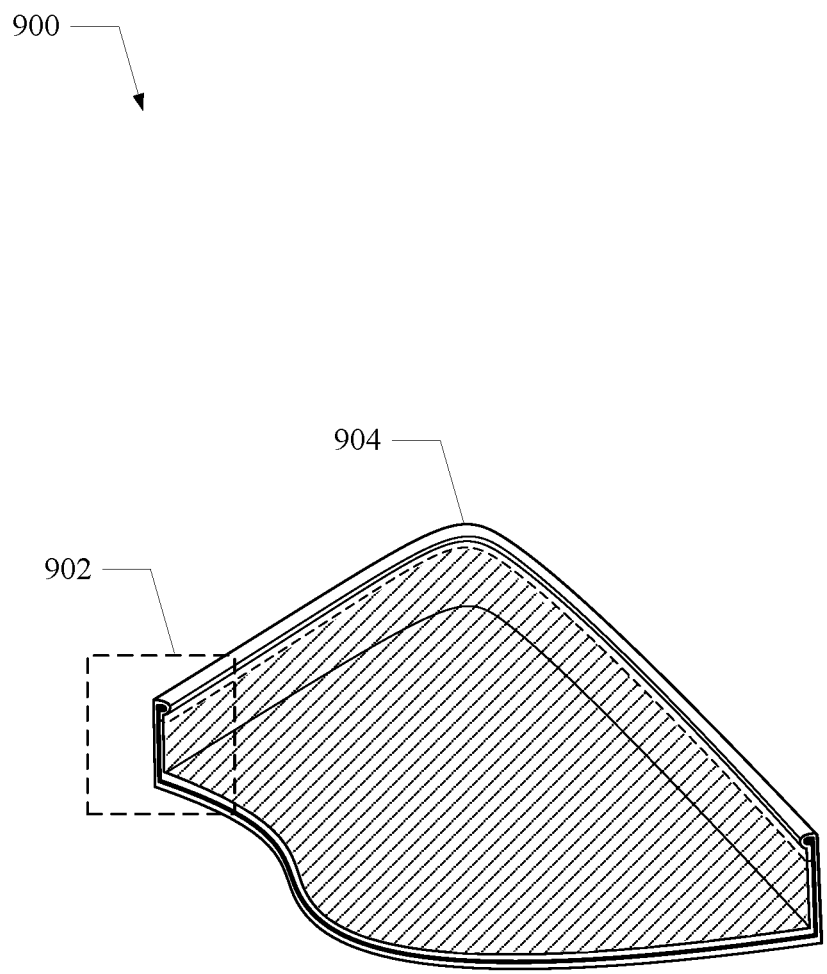
FIG. 9 illustrates a cross-sectional perspective view of the accessory cover depicted in FIG. 1 including an identified area of interest in accordance with some embodiments of the disclosure.

FIG. 9 illustrates a cross sectional view 900 of the accessory cover assembly 104 depicted in FIG. 1 including an identified area of interest 902, i.e., the area encompassed by a dotted rectangle, which can be representative of various implementations of the accessory cover assembly 904 that are described in further detail herein. In various embodiments, the cross sectional area of interest 902 of the accessory cover assembly 104 can correspond to the related cross sectional view 1000 shown in FIG. 10. Further, the related cutting assemblies 1100, 1200, and 1300, for producing the accessory cover assembly 104 depicted in the cross sectional views 900 and 1000 of FIGS. 9 and 10 are depicted in each of FIGS. 11, 12, and 13.

Figure 10:
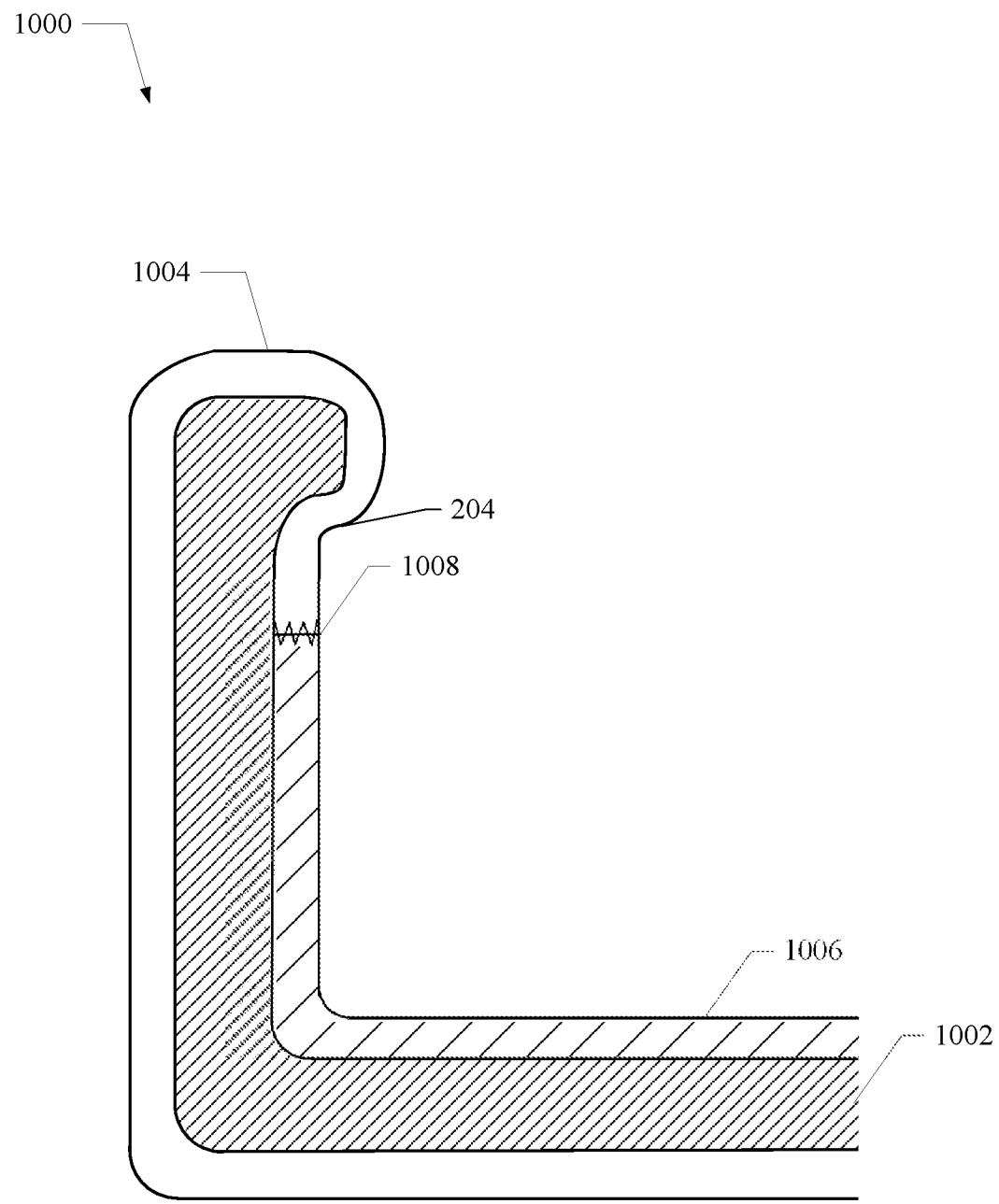
FIG. 10 illustrates a cross-sectional view of the identified area of interest of the accessory cover depicted in FIG. 9 according to an embodiment of the disclosure.

FIG. 10 illustrates a cross-sectional view 1000 of the identified area of interest 902 of the accessory cover assembly 104 of FIG. 9 according to an embodiment of the disclosure. As depicted, the cross-sectional view 900 of the accessory cover assembly 104 includes, but is not limited to, a frame 1002, a first covering portion 1004, a second covering portion 1006, and a coupling portion 1008.

In various implementations, the frame 1002 of the accessory cover assembly 104 can be composed of any one of, or a combination of: fiberglass, steel, carbon fiber, plastic, nylon, or other suitable rigid or semi-rigid material types. Further, the first covering portion 1004 of the accessory cover assembly 104 can be composed of a durable non-fabric material, such as leather, e.g., Nubuck leather, imitation leather, or suede. In other implementations, the first covering portion 1004 can be composed of a durable fabric material, such as microfiber, woven or non-woven fabrics, or a polymer-based film, e.g., polyurethane film or thermoplastic polyurethane film.

In an embodiment, the second covering portion 1006, or also referred to as material inlay herein, of the accessory cover assembly 104 can be composed of a fabric material, such as microfiber, woven or non-woven fabrics, or a polymer-based film, e.g., polyurethane film or thermoplastic polyurethane film. Alternatively, the second covering portion 1006 can be composed of a durable non-fabric material, such as leather, imitation leather, or suede. In some scenarios, material options for the first covering portion 1004 and the second covering portion 1006 of the accessory cover assembly 104 can be composed of both a non-fabric material and a fabric material, i.e., dissimilar material types. In other scenarios, the accessory cover assembly 104 can be composed entirely of a non-fabric material type(s), or alternatively, entirely of a fabric material type(s).

In various embodiments, the coupling portion 1008 of the accessory cover assembly 104 can be positioned a specified distance below a lip 204 of the frame 1002 so as to reduce wear to the coupling portion 1008 when a device 102 is inserted into and removed from the accessory cover assembly 104. In various implementations, the coupling portion 1008 can join the first covering portion 1004 to the second covering portion 1006 using any suitable adhesive, e.g., glue, epoxy resin, or double-sided tape, or stitching implement, such as a nylon thread having relatively high tensile strength.

In some embodiments, the second covering portion 1006 of the accessory cover assembly 104 can be formed using a bladder tool. For example, a layer of second covering portion 1006 can be positioned above a preheated accessory cover assembly 104. The bladder tool uses a balloon-like feature that is inflated into the second covering portion 1006. As a result, the second covering portion 1006 stretches and bonds to the preheated accessory cover assembly 104. Once bonded, the cutting assembly 1100 is used to cut any excess second covering portion 1006b off the perimeter of the accessory cover assembly 104.

In some scenarios, the coupling portion 1008 of the accessory cover assembly 104 can be annular in shape, such that the coupling portion 1008 is located entirely around, a periphery region of the internal lateral surface 312 of the frame 212. In this configuration, there may only be one connected coupling 1008 that spans a perimeter of the accessory cover assembly 104. Once the first covering portion 1004 and second covering portion 1006 are connected, they can be configured to envelop the entire frame 1002.

It should be understood, in accordance with some embodiments, that the accessory cover assembly 104 depicted in FIG. 10 can alternatively be configured to include a button assembly, as discussed above with respect to FIG. 5. For example, the auxiliary floating button 510 (of FIG. 5) can be suitably positioned between the first covering portion 1004 on an external lateral side of the frame 1002, and the second covering portion 1006 on the opposing internal lateral side of the frame 1002.

Figure 11:
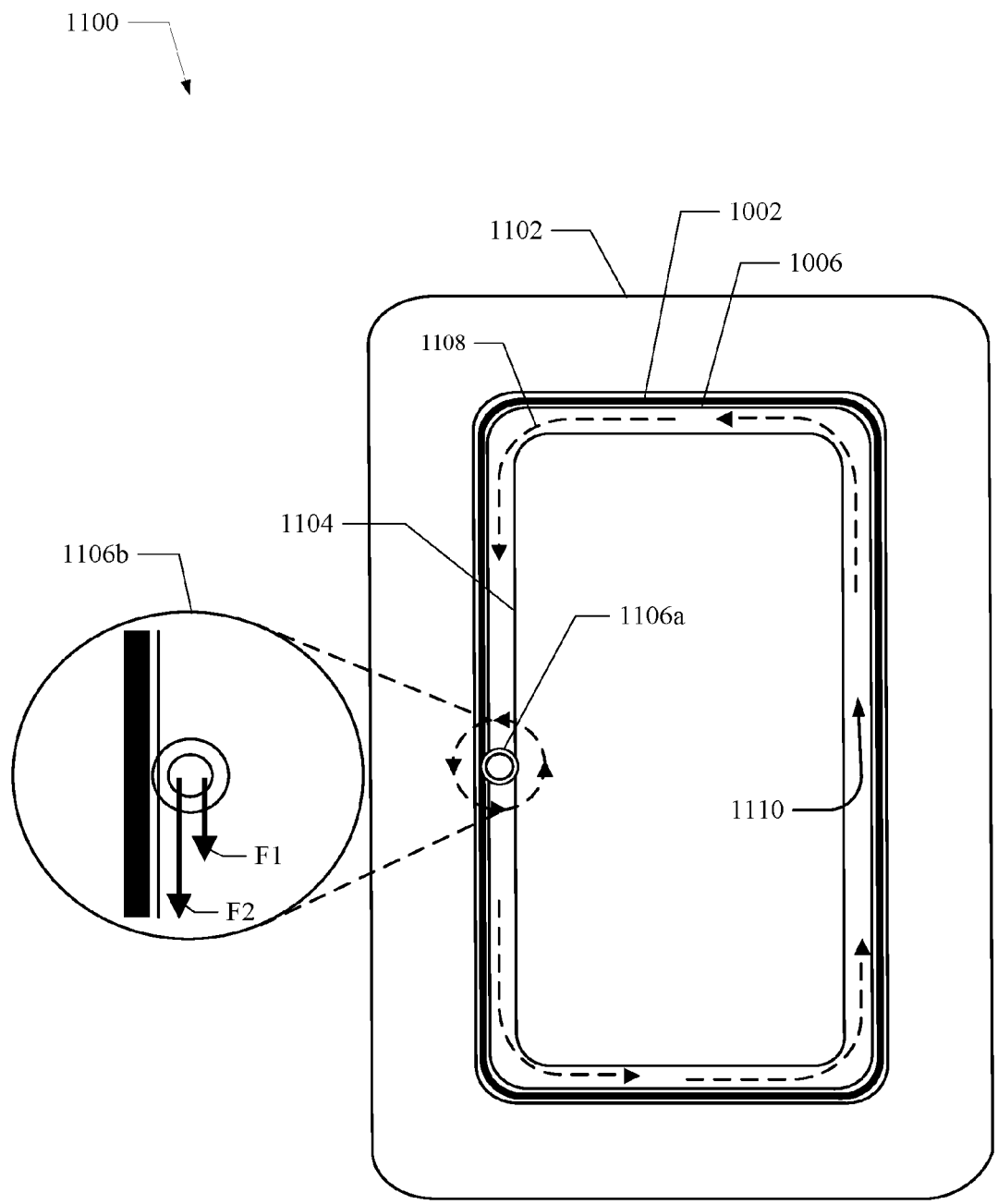
FIG. 11 illustrates an accessory cover cutting assembly including an exploded view depicting cutting and translational forces applied by a cutting device according to an embodiment of the disclosure.

FIG. 11 illustrates a cutting assembly 1100 including an exploded view 1106b depicting cutting force F1 and translational force F2 applied to the frame 1002 by a cutting device 1106a according to some embodiments. In one implementation, the cutting assembly 1100 can include a support block 1102 having a substantially rectangular shape, and including a recessed area 1110 that is configured to house both the frame 1002 of the accessory cover assembly 104 and a retaining plug 1104.

In some embodiments, the support block 1102 and/or the retaining plug 1104 can be composed of a rigid metal material, including, but not limited to, steel, aluminum, or any other suitable metal alloy. In other embodiments the support block 1102 and/or the retaining plug 1104 can be composed of a rigid non-metal material. In some scenarios, the retaining plug 1104 can be configured to fit within the recessed area 1110 of the support block 1102, on top of the frame 1002, in such a manner as to secure the second covering portion 1006 to the frame 1002 during cutting actions of the cutting assembly 1100, e.g., when the cutting device 1106a-b of the cutting assembly 1100 applies both a cutting force F1 and a translational force F2 to the second covering portion 1006 covering the frame 1002.

As would be appreciated by those skilled in the art, the cutting assembly 1100 can be associated with a computer numerical control (CNC) milling machine, and the cutting device 1106a-b can be a rotating drill-like implement that has a material cutting blade disposed at a distal end thereof. In some embodiments, a material cutting blade of the cutting device 1106a-b can be configured and shaped to cleanly slice through a fabric or non-fabric material of the second covering portion 1006 without damaging or cutting through a portion of the frame 1002 at substantially high rotational speeds, e.g., on the order of several thousands of rotations per minute (rpm) along a single cut path 1108.

In various implementations, the cutting device 1106a-b of the cutting assembly 1100 can be configured to fit within a recessed area 1110 between a lateral surface of the retaining plug 1104 and a lateral surface 312 of the support block 1102. The shape of the recessed area 1110 can mirror that of the internal lateral side walls of the support block 1102. During a cutting action, the cutting device 1106a-b can traverse along a cut path 1108 around the entire circumference of the recessed area to arrive back at its origin. In this manner, the cutting device 1106a-b can complete the cut path 1108 by translating within the recessed area in the direction of the cut path 1108. As a result of this patterned movement, the cutting device 1106a-b can apply a translational force F2 to a surface of the second covering portion 1006 being cut.

At the same time the cutting device 1106a-b applies the translational force F2 to a surface of the second covering portion 1006 being cut, the cutting blade of the cutting device 1106a-b can apply a cutting force F1 to the same surface of the second covering portion 1006, in the same direction (e.g., the blade rotation direction at the point where it touches the second covering portion 1006 during a cutting action), as depicted in the exploded view diagram of the cutting device 1106a-b. In this arrangement, the translational force F2 and cutting force F1 can act to mitigate problematic pulled misalignment of the second covering portion 1006 during cutting actions. This misalignment problem could otherwise be compounded by the fact that the second covering portion 1006 can be fixed to the frame 1002 with an adhesive that can melt at the temperatures generated by the cutting blade of the cutting device 1106a-b as it slices through the second covering portion 1006.

Figure 12:
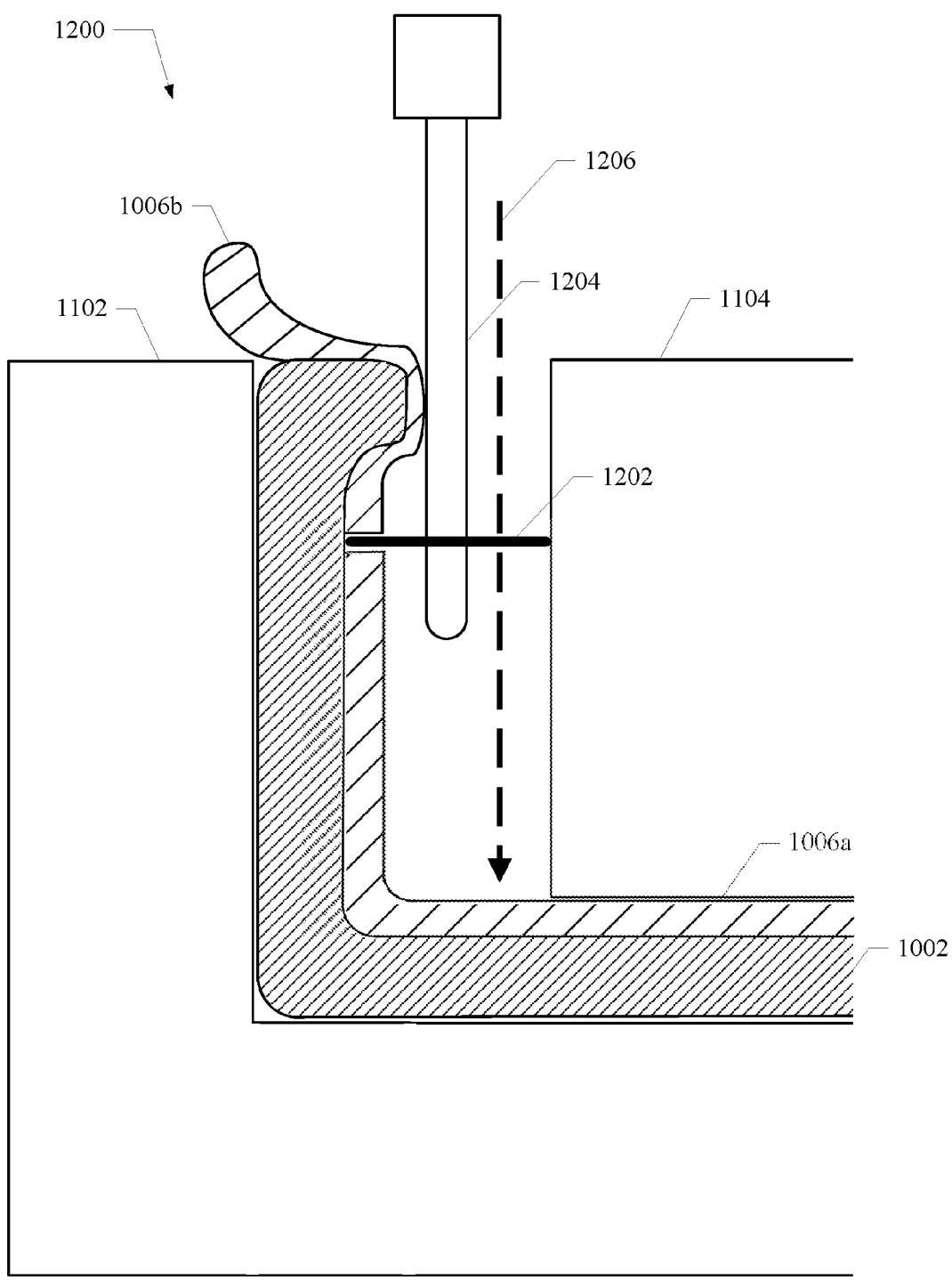
FIG. 12 illustrates a cross-sectional view of a portion of the cutting assembly of FIG. 11 depicting the cutting device according to an embodiment of the disclosure.

At FIG. 12 illustrates a cross-sectional view of a portion of the cutting assembly 1200 of FIG. 11 by depicting the cutting device 1204 according to an embodiment of the disclosure. In this arrangement, the cutting blade 1202 of the cutting device 1204 can be positioned within the recessed area, between the support block 1102 and the retaining plug 1104, a specified distance 1206 down from the top surface of the frame 1002. For example, the cutting device 1204 can be positioned a set distance below the lip 204 of the frame 1002, to cut the second covering portion 1006 to a specified length. In some implementations, by varying the depth that the cutting device 1204 is inserted within the recessed area, the cutting blade 1202 can be positioned to cut the second covering portion 1006a-b at any suitable location along an internal lateral surface 312 of the frame 1002, or alternatively, along an internal top surface 314 of the frame 1002.

As depicted in FIG. 12, the cutting blade 1202 of the cutting device 1204 is shown as already having performed a cutting action, and as a result, a cuttant or excess portion of the second covering portion 1006b has been cut/severed from a remaining portion of the second covering portion 1006a. During cutting, the cutting blade 1202, frame 1002, and cutting device 1204 can be cooled with air, or some other gas, or fluid coolant. After the cutting device 1204 circumscribes an entire circumference of the recessed area 1110 in a single rotation around the recessed area 1110, the excess portion of the second covering portion 1006b can be removed from the frame 1002 and discarded. In certain embodiments, the recessed area 1110 between the support block 1102 and the retaining plug 1104 can act as a guide for the cutting device 1204 during various cutting actions. In scenarios where a CNC milling machine is being used as the cutting device 1204, a physical cutting guide may be less necessary to aid precision cutting actions as compared to other manually implemented machining embodiments.

In some embodiments, that cutting blade 1202 of the cutting device 1204 can be configured to cut through the second covering portion 1006 and the first covering portion 1004 at the same time (e.g., in a scenario where these covering are overlapped during fabrication) to produce the best joint. In this scenario, the cut edges of the second covering portion 1006 and the first covering portion 1004 can be arranged to line up evenly at all points along an annular abutment region defined by the cut edges. In some embodiments, the first covering portion 1004 can be adhered to the frame 1002 and cut by the cutting device 1204 before the second covering portion 1006 is cut by the cutting device. In some embodiments, the second covering portion 1006 can be adhered to the frame 1002 and cut by the cutting device 1204 before the first covering portion 1004 is cut by the cutting device 1204.

Figure 13:
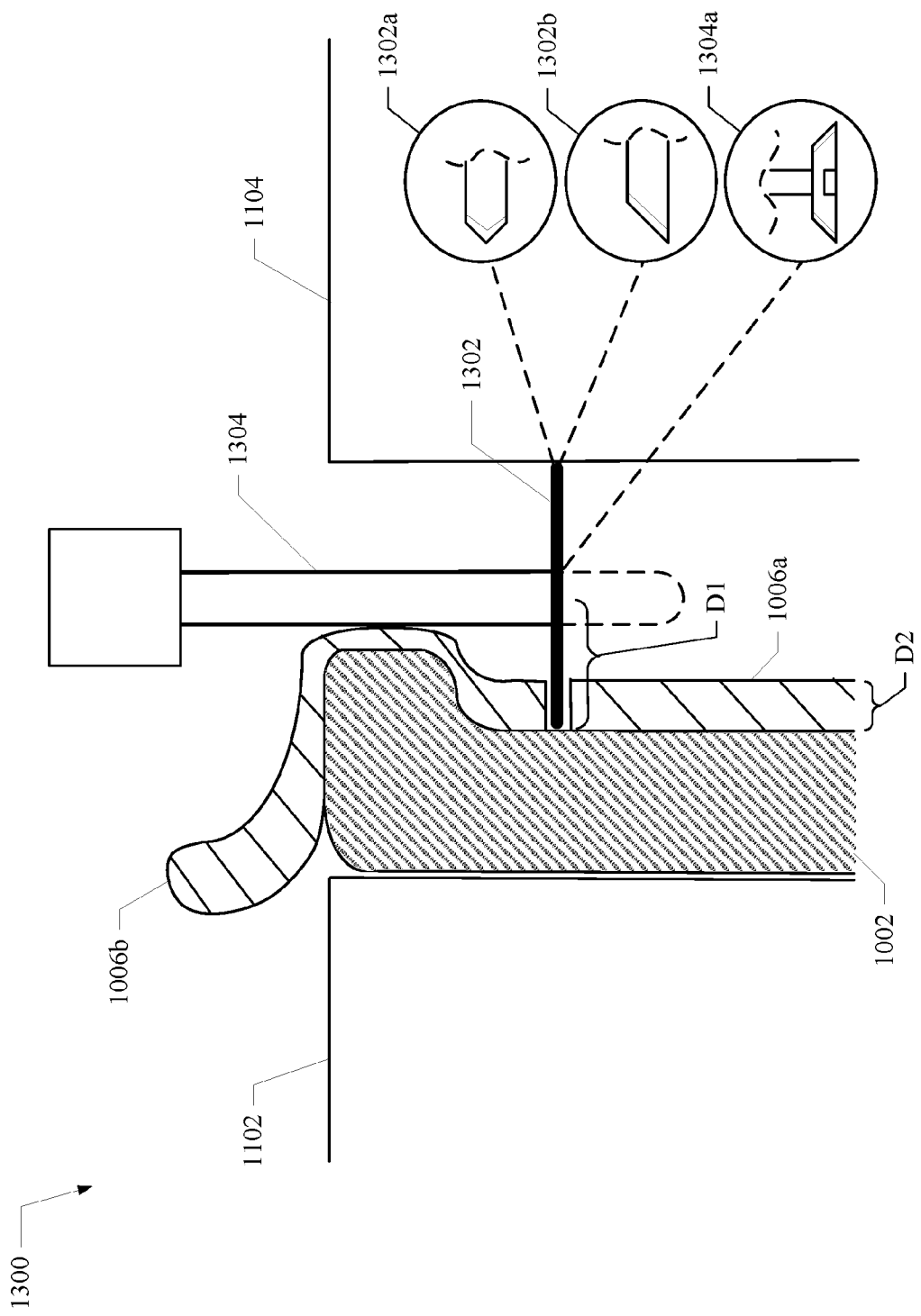
FIG. 13 illustrates a cross-sectional view of a portion of the cutting assembly of FIG. 11 depicting exploded views of the cutting device according to various embodiments of the disclosure.

FIG. 13 illustrates a cross-sectional view of a portion of the cutting assembly 1100 of FIG. 11 by depicting exploded views of alternative cutting devices and/or cutting blades 1302 according to various embodiments of the disclosure. In some scenarios, the cutting device 1304 can be attached to a milling machine and/or a drill via a spline. Further, the cutting device 1304 can be configured in such a manner that its cutting blade 1302 is positioned either at a distal end of a spindle portion of the cutting device 1304, or alternatively, at any position between the distal end of the spindle portion and an upper spline portion of the cutting device that connects the cutting device 1304 to a milling machine and/or a drill. The location of the cutting blade 1302 determines how much of the excess portion of the second covering portion 1006b is discarded and how much of the remaining portion of the second covering portion 1006a is left on the frame 1002 after cutting is complete.

In some embodiments, the cutting blade 1302 of the cutting device 1304 can be configured to have any number cutting edge(s) and or blade shapes e.g., such as the cutting blade alternatives depicted in exploded views 1302a and 1302b, to better cut a particular material type of the second covering portion 1006a-b at a specified location along an internal lateral surface 312 of the frame 1002 or along the internal top surface 314 of the frame 1002. The angles at the edge of the cutting blades 1302 depicted in exploded views 1302a and 1302b can vary for different applications to provide a more or less invasive incision. Further, the cutting device 1304 can be arranged to angle the cutting blade or blades 1302 at any number of suitable cutting angles, e.g., at a 45, 60, or 90 degree cutting angle, etc., to provide for a suitable cut location and/or a suitable material edge and/or shape e.g., where the second covering portion 1006a is cut to have an angled edge that mates with a complimentary angled edge of the first covering portion 1004.

Additionally, in some scenarios, the cutting device 1304 can be configured in such a manner that its cutting blade 1302 is positioned at a distal end of the spindle portion of the cutting device 1304, e.g., as depicted in exploded view of the cutting blade 1304a, such that the cutting blade 1302 can meet flush with a top internal surface of the covered frame 1002 during a cutting action. The cutting blade 1302 can be attached to the cutting device 1304 with a single screw that tightens completely within a screw recess of the cutting device (as detailed the view of cutting blade 1304a in FIG. 13 so as to ensure a flush cut with no damage to the second covering portion 1006 or frame 1002. In some embodiments, the cut depth D2 can be programed into a CNC milling machine to eliminate or substantially reduce abrasions or cuts to the surface of the frame 1002 at a specified cut location. A variable of precision would need to be employed to keep a cutting blade length D1 from exceeding a desired cut depth D2 during a single circumferential cutting operation.

Although the foregoing disclosure has been described in detail by way of illustration and example for purposes of clarity and understanding, it will be recognized that the above described disclosure can be embodied in numerous other specific variations and embodiments without departing from the spirit or essential characteristics of the disclosure. Certain changes and modifications can be practiced, and it is understood that the disclosure is not to be limited by the foregoing details, but rather is to be defined by the scope of the appended claims.

What is claimed is:

1. A button assembly for an accessory case that releasably secures an electronic device that include a device button, the button assembly comprising:
   a first cover layer;
   a button comprising a convex feature that extends into the first cover layer, the button further comprising a concave feature located opposite the convex feature;
   a second cover layer extending over and at least partially into the button along the concave feature, wherein an applied force to the button facilitates an actuation of the device button when the button is positioned over the device button.

2. The button assembly of claim 1, wherein the second cover layer statically positions the button at least partially out of a cavity defined by the first cover layer and the second cover layer.

3. The button assembly of claim 2, further comprising:
   a compressible material configured to align the button with the cavity and transfer a force of the actuation to the device button, the compressible material conforming to at least the concave feature.

4. The button assembly of claim 1, wherein the second cover layer is positioned between the button and the device button when the electronic device is positioned in the accessory case.

5. The button assembly of claim 1, further comprising a frame positioned between the first cover layer and the second cover layer, the frame having an opening, wherein the button is positioned in the opening and wherein a gap separates the button from the first cover layer, the second cover layer, and the frame.

6. The button assembly of claim 1, wherein the button is connected to the second cover layer and disconnected from the first cover layer.

7. The button assembly of claim 1, wherein the applied force causes the concave feature to provide the actuation of the device button.

8. A device cover for an electronic device, the device cover comprising:
   a frame that includes a bottom wall and sidewalls perpendicular to the bottom wall, the sidewalls combining with the bottom wall to define a receptacle that receives the electronic device, wherein the sidewalls include a sidewall having an aperture;
   a cover disposed over a portion of the frame;
   a button that is separate from the cover and held within the aperture and hidden by the cover, wherein an applied force to the cover in a location corresponding to the button actuates the button to depress a device button of the electronic device when the electronic device is within the receptacle.

9. The device cover of claim 8, wherein:
   the frame defines a lip formed on an edge of the sidewall,
   the frame includes a first thickness, and
   the lip includes a second thickness greater than the first thickness.

10. The device cover of claim 9, wherein the cover comprises:
    a first cover layer that covers the sidewall and the lip; and
    a second cover layer coupled to the first cover layer and covering the button.

11. The device cover of claim 8, further comprising:
    a compressible material surrounding at least two surfaces of the button within the aperture.

12. The device cover of claim 8, wherein the button includes:
    a convex feature that extends away from the device button and causes the cover to extend away from the device button; and
    a concave feature located opposite the convex feature, the concave feature positioned between the convex feature and the device button when the electronic device is in the receptacle.

13. The device cover of claim 8, wherein the cover comprises a first cover layer coupled to a second cover layer by a coupling portion located at the bottom wall.

14. The device cover of claim 8, wherein the aperture defines a gap that surrounds at least four surfaces of the button.

15. An accessory device for an electronic device, the accessory device comprising:
    a frame that includes a bottom wall and sidewalls that combine with the bottom wall to define a receptacle that receives the electronic device, wherein the sidewalls include a sidewall having a cavity;
    a first cover that covers an external surface of the frame;
    a second cover that covers an internal surface of the frame including the receptacle;
    a button disposed within the cavity and separated from the frame, the first cover, and the second cover by a gap; and
    a filler material positioned in the gap and surrounding the button within the cavity, wherein the button is configured to glide through the cavity when the first cover receives a pressing force at a location corresponding to the button.

16. The accessory device of claim 15, wherein the button comprises:
    a convex feature engaging the first cover; and
    a concave feature engaging the second cover.

17. The accessory device of claim 15, wherein the button comprises a protruding button having a first convex feature and a second convex feature opposite the first convex feature.

18. The accessory device of claim 17, wherein the first convex feature engages the first cover and wherein the second convex feature engages the second cover.

19. The accessory device of claim 18, wherein the frame includes a lip extending in a direction toward the cavity and covered by the first cover, and wherein the lip includes a greater thickness than that of the sidewall.

20. The accessory device of claim 15, wherein the button is separated from the first cover and the second cover by a gap.

* * * * *